April 30, 1957    C. O. PIKE ET AL    2,790,285
SECONDARY CLOSURES
Filed July 27, 1953
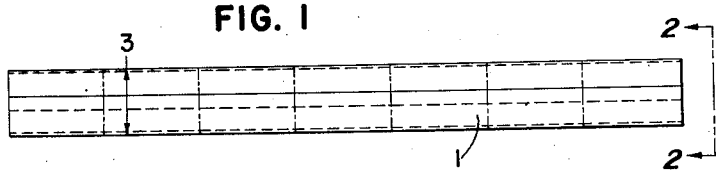
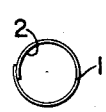
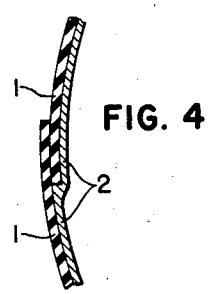
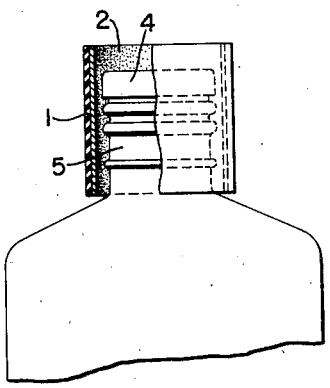
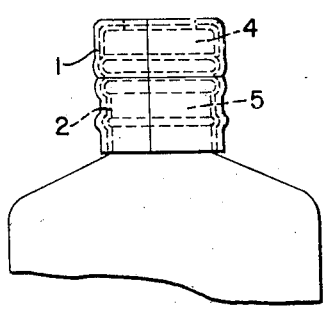
INVENTOR.
JAMES E. SNYDER
CHARLES O. PIKE
BY
R. L. Miller
ATTORNEY

# United States Patent Office 2,790,285
Patented Apr. 30, 1957

2,790,285

SECONDARY CLOSURES

Charles O. Pike, Troy, N. Y., and James E. Snyder, Akron, Ohio, assignors, by mesne assignments, to The Goodyear Tire & Rubber Company, a corporation of Ohio Application July 27, 1953, Serial No. 370,443

2 Claims. (Cl. 53—39)

This invention relates to secondary closures for bottles of liquor, pharmaceuticals, etc.

Secondary closures are used on such bottles as a means of preventing the contents from being adulterated or otherwise tampered with. The secondary closures are used over primary closures. Thus, a stopper or other primary closure which fits tight in the neck of a bottle, is covered with a secondary closure.

It has been suggested that secondary closures be formed on bottle necks by shrinking stretched thermoshrinkable film over the stopper and about the neck. Before use, this film is heated and stretched circumferentially of the bottle neck and formed into a band and then preferably cooled. Being formed of thermoshrinkable material, on subsequent heating it will tend to shrink to its original dimensions. The stretched band is slipped over the neck of the bottle and heated to cause it to shrink tight against the stopper and the bottle neck. Such secondary closures have not proved altogether satisfactory because, by grasping the bottle in one hand, the secondary closure in the other, and then twisting, the secondary closure may be twisted off the bottle neck intact. The contents of the bottle may be removed and replaced with other contents, or part may be removed and the balance diluted or adulterated. The undamaged secondary closure may then be replaced.

According to this invention, the secondary closure is not only shrunk onto the bottle neck, but it is adhered to it by a thermally activatable adhesive. This adhesive may be one which becomes tacky on heating and from which the tack disappears when the adhesive is cooled, or it may be made of dry components which react when heated and become tacky and may remain tacky upon subsequent cooling.

The thermally activatable adhesive is applied to the inner surface of the stretched film that forms the secondary closure. The adhesive is then allowed to dry. In its dry condition, it is not tacky.

When the secondary closure of stretched film which has been so treated is placed over the neck of a bottle or other container and is then heated, the adhesive becomes tacky simultaneously with the shrinking of the closure. The closure is shrunk tight onto the bottle and it is simultaneously adhered to the bottle by the adhesive. Such a secondary closure is tamper-proof. It cannot be removed from the bottle neck without being damaged or destroyed.

The invention will be further described in connection with the accompanying drawings in which—

Fig. 1 is a long or continuous tube of the laterally stretched thermoshrinkable film from which the secondary closures are to be formed;

Fig. 2 is a section on the line 2—2 of Fig. 1;

Fig. 3 is an enlarged detail of the tube showing the adhesive on the inner surface;

Fig. 4 is a modification of the tube shown in Fig. 3;

Fig. 5 shows the band in place over a corked bottle; and

Fig. 6 is a view of the same after the band has been heated and the adhesive has been adhered to the neck of the bottle.

Tube 1 may be of rubber hydrochloride film or of other thermoshrinkable packaging film such as Saran (copolymer of vinyl chloride nad vinylidine chloride), Cry-O-Wrap, etc. Thus, the tube may be formed by seaming a web of laterally stretched film, or the tube may be formed of unstretched film and the completed tube may then be stretched. The drawings show a tube formed in either of these ways, but the invention is not limited to the use of tubes formed in any particular manner.

Fig. 2 shows the inner surface of the tube before being coated with the adhesive. In Fig. 1, the dotted lines across the tube show where the tube is to be cut to form the individual secondary closures. The arrows 3 show that the tube has been stretched laterally. Preferably, the adhesive 2 (Fig. 3) is applied to the stretched web and dried before fabricating the tube. Fig. 4 illustrates a modified structure in which the film is coated with the adhesive after formation of the tube.

An adhesive which is non-tacky at normal temperature and which becomes tacky on heating may be employed. A 10 percent solution of chlorinated rubber (Tornesite) has been used successfully. A mixed solvent of ethyl acetate and gasoline has been found satisfactory if used on a secondary closure of rubber hydrochloride. Another satisfactory adhesive is a 10 percent solution of cyclized rubber in gasoline. The thermoactive adhesive coating may be pigmented or dyed to obtain color effects if desired.

The tube which is to form the secondary closure is placed over a bottle neck as in Fig. 5. The bottle may be closed with a cork or a metal cap or other suitable primary closure 4. On heating, the secondary closure shrinks tight against the bottle neck 5 and covers the primary closure. Simultaneously, the adhesive becomes tacky, and when the secondary closure is shrunk tight onto the bottle neck, the adhesive holds it firmly in place. It may unite the secondary closure to the primary closure as well as adhering it to the bottle neck. The adhesive is preferably one which hardens on subsequent cooling. However, the thermo-activation may cause a reaction to set in which produces a thermo-setting adhesive which remains slightly tacky on completion of the reaction and which adheres strongly to the bottle neck. One method of heating a secondary closure to shrink it onto a bottle neck is disclosed in Pike and Snyder 2,328,845. Other methods may be used.

Fig. 6 illustrates the completed package with the secondary closure 1 shrunk onto the bottle and adhered to the bottle by the adhesive so that it cannot be removed without being torn or otherwise damaged so that it cannot be reused. If this final package is grasped in the two hands with one hand about the body of the bottle and the other grasping the secondary closure about the bottle neck, the secondary closure cannot be loosened by turning the two hands with respect to one another without damaging it. The type of secondary closure shown in Fig. 6 adheres to the cork or stopper 4 as well as to the bottle neck. It cannot be removed without damage and thus it forms a tamper-proof secondary closure valuable for use on liquor, pharmaceuticals, etc.

In the description, reference has been made more particularly to the use of secondary closures on bottles, but it is to be understood that the secondary closures of this invention may be similarly applied to other conatiners, although different adhesives will ordinarily be required for adherence to containers.

What we claim is:

1. The process of shrinking and adhering a heat-shrinkable, tubular secondary closure onto the neck of a container in which is an opening closed with a primary closure, with a thermally activatable adhesive between the secondary closure and the neck of the container, which process includes heating the secondary closure and the adhesive, thereby shrinking the secondary closure onto the neck of the container and simultaneously rendering the adhesive tacky and whereby the secondary closure by shrinking squeezes the adhesive tight against the neck of the container.

2. The process of shrinking a stretched heat-shrinkable, tubular secondary closure of rubber hydrochloride onto the neck of a bottle the opening through which is closed with a primary closure, which comprises applying a solution of non-tacky chlorinated rubber to the inner surface of the secondary closure, drying it to a non-tacky coating, then placing the secondary closure around the neck with the adhesive on the inside surface of the secondary closure and heating it and thereby simultaneously activating the coating and shrinking the closure to the neck whereby the secondary closure draws the activated coating to the neck and adheres it thereto.

References Cited in the file of this patent

UNITED STATES PATENTS

| | | |
|---|---|---|
| 2,026,216 | Daley | Dec. 31, 1935 |
| 2,168,651 | McCoy | Aug. 8, 1939 |
| 2,236,552 | Ushakoff | Apr. 1, 1941 |
| 2,331,794 | Mallory | Oct. 12, 1943 |
| 2,338,787 | Ushakoff | Jan. 11, 1944 |
| 2,447,983 | Little | Aug. 24, 1948 |
| 2,565,316 | Lucas et al. | Aug. 21, 1951 |
| 2,666,542 | Price | Jan. 19, 1954 |

FOREIGN PATENTS

| | | |
|---|---|---|
| 552,245 | Great Britain | Mar. 29, 1943 |